(12) United States Patent
Pages-Xatart (10) Patent No.: US 12,202,243 B2
(45) Date of Patent: Jan. 21, 2025

(54) MULTI-MATERIAL MULTILAYER STRIP FOR WINDING

(71) Applicant: ARIANEGROUP SAS, Les Mureaux (FR)

(72) Inventor: Guillaume Pages-Xatart, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 346 days.

(21) Appl. No.: 17/668,919

(22) Filed: Feb. 10, 2022

(65) Prior Publication Data

US 2022/0250350 A1 Aug. 11, 2022

(30) Foreign Application Priority Data

Feb. 11, 2021 (FR) ...................................... 2101309

(51) Int. Cl.
*B29C 53/56* (2006.01)
*B29C 53/00* (2006.01)
(Continued)

(52) U.S. Cl.
CPC .............. *B32B 5/26* (2013.01); *B29C 53/005* (2013.01); *B29C 53/56* (2013.01); *B29C 70/20* (2013.01);
(Continued)

(58) Field of Classification Search
CPC ....... B29C 53/005; B29C 53/56; B29C 70/10; B29C 70/16; B29C 70/20; B29C 70/202; B29C 70/22; B29C 70/228; B29C 70/30; B29C 70/32; B29K 2995/0007; B29K 2995/0015; B29L 2031/3097; B32B 1/08; B32B 3/04; B32B 3/10; B32B 3/14; B32B 3/16; B32B 3/18; B32B 5/02; B32B 5/08;
(Continued)

(56) References Cited

U.S. PATENT DOCUMENTS 4,621,662 A 11/1986 Olry
7,550,186 B2 6/2009 Huang et al.
(Continued)

FOREIGN PATENT DOCUMENTS

EP 3 418 046 A1 12/2018
EP 3 492 249 A1 6/2019
FR 2 962 933 A1 1/2012

OTHER PUBLICATIONS

KR Search Report as issued in French Patent Application No. 2101309, dated Oct. 5, 2021.

*Primary Examiner* — Michael A Tolin
(74) *Attorney, Agent, or Firm* — Pillsbury Winthrop Shaw Pittman LLP (57) ABSTRACT

A multilayer strip intended to be wound on a form to manufacture a part in composite material, includes superposed fibrous layers, at least one of these layers being pre-impregnated, the superposed fibrous layers including a first layer including a first material on a first side of the width of the strip and a second material, differing from the first material, on a second side of the width of the strip opposite the first side, and a second layer superposed on the first layer and including the first material on the first side and the second material on the second side, with overlapping of a material of the second layer over a different material of the first layer.

15 Claims, 6 Drawing Sheets

(51) Int. Cl.
- *B29C 70/20* (2006.01)
- *B29C 70/22* (2006.01)
- *B29C 70/30* (2006.01)
- *B29C 70/32* (2006.01)
- *B29L 31/30* (2006.01)
- *B32B 3/14* (2006.01)
- *B32B 5/02* (2006.01)
- *B32B 5/26* (2006.01)

(52) U.S. Cl.
CPC .............. *B29C 70/22* (2013.01); *B29C 70/30* (2013.01); *B29C 70/32* (2013.01); *B32B 3/14* (2013.01); *B32B 5/02* (2013.01); *B29K 2995/0007* (2013.01); *B29K 2995/0015* (2013.01); *B29L 2031/3097* (2013.01); *B32B 2260/023* (2013.01); *B32B 2260/046* (2013.01); *B32B 2307/102* (2013.01); *B32B 2307/204* (2013.01)

(58) Field of Classification Search
CPC .... B32B 5/12; B32B 5/26; B32B 7/05; B32B 7/12; B32B 19/02; B32B 2250/02; B32B 2250/03; B32B 2250/20; B32B 2260/023; B32B 2260/046; B32B 2262/0269; B32B 2262/10; B32B 2262/101; B32B 2262/105; B32B 2262/106; B32B 2307/102; B32B 2307/204; B32B 2307/304; B32B 2307/738; B32B 2605/18

See application file for complete search history.

(56) References Cited

U.S. PATENT DOCUMENTS

| | | | |
|---|---|---|---|
| 2010/0215887 A1* | 8/2010 | Kawabe | B29C 70/202 264/102 |
| 2019/0160760 A1 | 5/2019 | Pages-Xatart et al. | |
| 2019/0276616 A1 | 9/2019 | Kia et al. | |

* cited by examiner

MULTI-MATERIAL MULTILAYER STRIP FOR WINDING

CROSS-REFERENCE TO RELATED APPLICATIONS

This application claims priority to French Patent Application No. 2101309, filed Feb. 11, 2021, the entire content of which is incorporated herein by reference in its entirety.

FIELD

The present invention relates to the general field of methods for manufacturing parts in multi-material composite material, implementing in particular the winding of strips of pre-impregnated fabric.

BACKGROUND

Thermal protection parts of ablative type are parts of revolution in composite material and can comprise protective layers formed of different materials. Each material used has own characteristics adapted to local stresses, thereby increasing the performance of the part.

The manufacture of these parts generally requires several steps comprising formation of a first protective layer e.g. in carbon, autoclave treatment, machining of said layer and formation of a second layer e.g. in glass or silica. The protective layers can be obtained by winding for example, a method adapted for parts of revolution. Said method is particularly described in document U.S. Pat. No. 4,621,662A for developable parts of revolution and in document US2019160760A1 in particular for non-developable parts of revolution. The strips used for winding can be pre-assembled in the form of multilayer strips before winding which largely reduces the operating time of winding. Said strips are described in document EP3418046B1.

This sequence of operations leads to parts that are costly, with manufacturing that is complex and time-consuming. In addition, the large thickness of the two protective layers results in reduced engine performance on account of the increase in mass and bulk. To solve this issue, it is possible to proceed by alternate angle-lamination of strata of different materials. With this method it is possible to obtain two fairly thin, partially superposed protective layers each in a different material. Said method is described in document U.S. Pat. No. 7,550,186.

However, this method of alternate angle-lamination maintains several drawbacks. The defining, cutting and angle-laminating of strata remain complex to perform, in particular to ensure a proper junction between the strata. Lengthy, tricky machining must also be carried out. This method is therefore only adapted to some scarcely complex parts. Finally, the end part obtained with this angle-lamination method is not orthotropic.

SUMMARY

An aspect of the present invention is to overcome the aforementioned disadvantages and to propose a solution with which it is possible to obtain parts in composite material comprising layers formed of different materials e.g. thermal protection parts of ablative type.

For this purpose, the invention according to a first aspect proposes a multilayer strip intended to be wound on a form to manufacture a part in composite material, comprising superposed fibrous layers, at least one of these layers being pre-impregnated, said superposed fibrous layers comprising:
a first layer comprising a first material on a first side of the width, and a second material differing from the first material on a second side of the width of the strip opposite the first side; and
a second layer superposed on the first layer comprising the first material on the first side and the second material on the second side, with overlapping of a material of the second layer over a different material of the first layer.

By «first side», it is meant a portion of the width of the strip which comprises a first longitudinal edge of the strip. By «second side», it is meant a portion of the width of the strip which comprises the second longitudinal edge of the strip, opposite the first longitudinal edge.

Therefore, with the forming of a multi-material multilayer strip, lengthy, tricky—and hence costly—steps of machining are obviated, the different protective layers being deposited simultaneously on the form by winding, and a structure is obtained that is adapted to needs through the use of different materials each having own characteristics. The thickness of the part is thereby reduced and optimised, leading to an increase in engine performance. Finally, by permitting manufacture via winding, an orthotropic end part is obtained allowing parts of more complex shapes.

According to one particular characteristic of the invention, the first and second layers further comprise a third material differing from the first and second materials and positioned therebetween.

According to another particular characteristic of the invention, the superposed fibrous layers further comprise a third layer superposed on the first and second layers, the third layer comprising the first material on the first side and the second material on the second side, with overlapping of a material of the third layer over a different material of the second layer.

According to a further characteristic of the invention, an outer fibrous layer is dry.

According to a further characteristic of the invention, one of the sides of the strip among the first side and second side is pre-impregnated, the other side being dry.

According to another characteristic of the invention, the first side and second side of the strip are pre-impregnated.

According to a further particular characteristic of the invention, the superposed fibrous layers are two-dimensional fabrics.

According to a further characteristic of the invention, the superposed fibrous layers are segmented along a longitudinal direction of the strip with joining of the consecutive segments of one layer via overlapping by a segment of an adjacent layer.

According to a further particular characteristic of the invention, the superposed fibrous layers comprise fibres in first material on the first side and fibres in second material on the second side.

According to a further particular characteristic of the invention, the superposed fibrous layers comprise a first resin in first material impregnating fibres on the first side, and a second resin in second material impregnating fibres on the second side.

According to a further particular characteristic of the invention, one of the first, second and optional third materials is a thermal insulator and another of the first, second and optional third materials is a dielectric insulator.

According to a further characteristic of the invention, one of the first, second and optional third materials is a first thermal insulator and another of the first, second and optional third materials is a second thermal insulator differing from the first thermal insulator.

Another aspect of the invention also relates to a method for manufacturing the multilayer strip such as described above, comprising:
- forming a stack by superposing the second layer on the first layer with overlapping of a material of the first layer by a different material of the second layer;
- heating the stack of first and second layers to a temperature at least equal to the softening point of at least one resin contained therein;
- compacting the stack of heated first and second layers to cause them to adhere to each other.

In yet another aspect of the invention also relates to a method for manufacturing a fibrous preform of a part in composite material, comprising the winding of the multilayer strip such as described above around a form.

According to one particular characteristic of the invention, the prepared fibrous preform is orthotropic.

An aspect of the invention also relates to a method for manufacturing a part in composite material comprising the manufacture of a fibrous preform by implementing the method described above, and heat treating at least one resin present in the preform to obtain a part in composite material.

According to one particular characteristic of the invention, the manufactured part in composite material is a rocket engine part.

DETAILED DESCRIPTION

Figure 1:
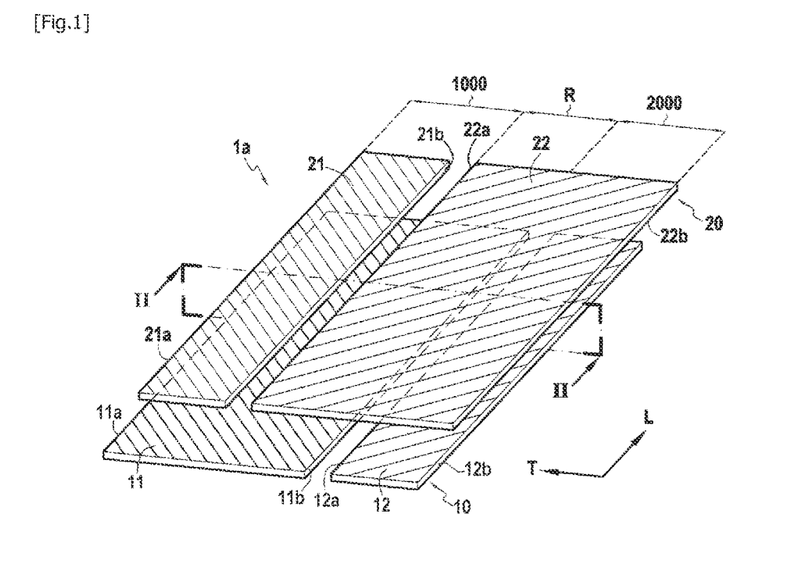
FIG. 1 is an exploded, partial schematic view in perspective of a multi-material multilayer strip comprising two superposed layers, conforming to one embodiment of the invention.
Figure 2:
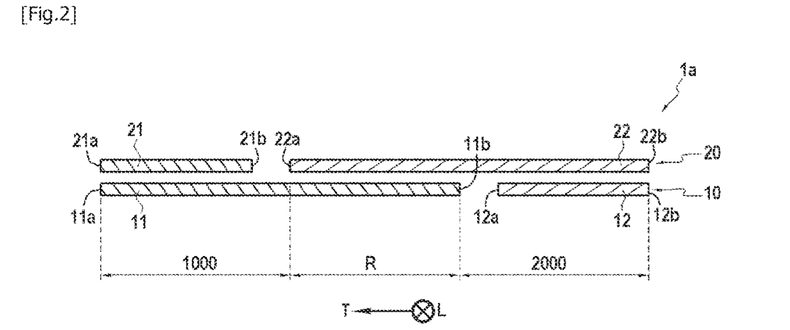
FIG. 2 is a schematic cross-sectional view of the strip in FIG. 1 taken transverse to the longitudinal direction of the strip.
Figure 3:
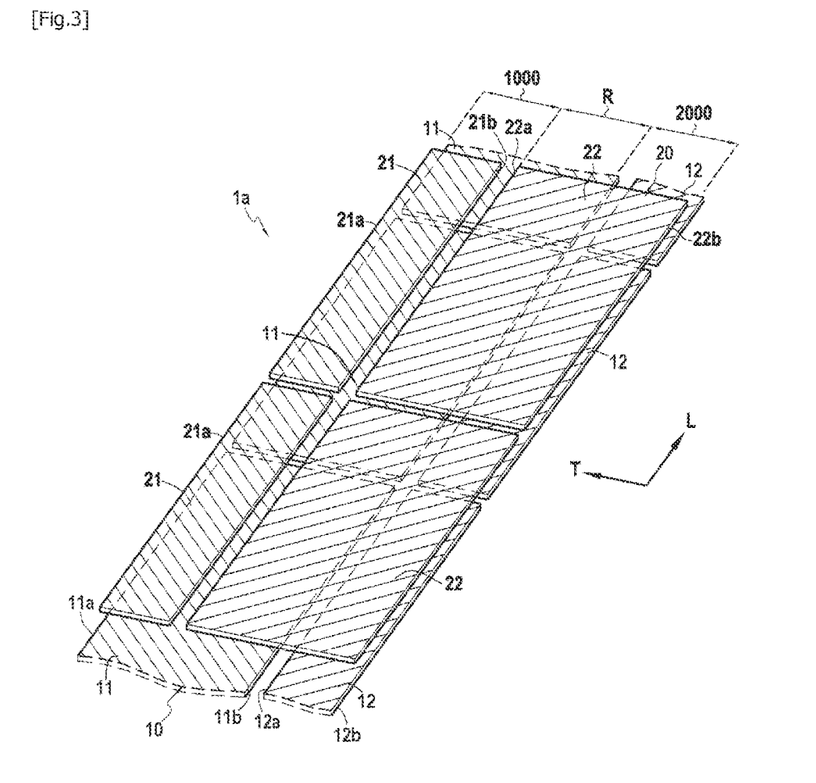
FIG. 3 is an exploded perspective view of the strip in FIG. 1 showing the arrangement of the segments and continuity of material in the longitudinal direction.

FIGS. 1-3 show a multilayer strip comprising two superposed layers, in one embodiment of the invention. As is detailed below, this strip can be used to manufacture a part in composite material.

The multilayer strip 1a comprises a first layer 10 comprising a first pre-impregnated fibrous structure 11 comprising a first material on a first side 1000 of the width of the strip 1a, delimited by two longitudinal edges 11a and 11b, and a second pre-impregnated fibrous structure 12 comprising a second material on a second side 2000 of the width of the strip 1a, opposite the first side 1000, and delimited by two longitudinal edges 12a and 12b. The strip 1a extends in longitudinal direction L, and direction T marks the direction across the width of the strip 1a (largest transverse dimension of the strip 1a). The multilayer strip 1a also comprises a second layer 20 comprising a first pre-impregnated fibrous structure 21 comprising the first material on the first side 1000 of the width of the strip 1a, delimited by two longitudinal edges 21a and 21b, and a second pre-impregnated fibrous structure 22 comprising the second material on the second side 2000 of the width of the strip 1a, delimited by two longitudinal edges 22a and 22b.

The second layer 20 is superposed on the first layer 10, with an overlap of the second material of the second layer 20 over the first material of the first layer 10. There is overlap over a distance R of the second fibrous structure 22 of the second layer 20 over the first fibrous structure 11 of the first layer 10. This overlap allows securing of the second layer 20 to the underlying first layer 10. The second fibrous structure 22 of the second layer 20 overlaps the longitudinal edges 11b and 12a of the fibrous structures 11 and 12 of the first layer 10.

The overlap distance R is sufficient to obtain cohesion of the strip 1a. For example, the overlap distance is greater than or equal to 5 mm, for example greater than or equal to 10 mm, even between 10 mm and 300 mm. Unless otherwise indicated, this distance is measured along direction T.

In the example described here, the two layers 10 and 20 are also superposed so that the longitudinal edges 11a and 21a are superposed and the longitudinal edges 12b and 22b are superposed.

In this example, the fibrous structures 11, 12, 21 and 22 are two-dimensional fabrics pre-impregnated with resin, the orientation of the fibres being defined according to the stresses to which the structures will be subjected. The fibrous structures can also have been formed three-dimensional weaving, provided that the end thickness of the multilayer strip 1a allows winding. Finally, the fibrous structures can also have been formed from unidirectional (UD) fibre layers or plies.

The fibres of the fibrous structures 11, 12, 21 and 22 of the first and second layers 10 and 20 can be in carbon, in Kevlar, in ceramic e.g. in silica, in glass, in silicon carbide (SIC). The fibrous structures 11, 12, 21 and 22 of the first and second layers 10 and 20 can be impregnated with at least one cross-linkable resin e.g. an epoxy resin or phenolic resin, or a precursor resin of carbon or ceramic e.g. silicon carbide (SIC).

According to a first variant, the first fibrous structures of the strip are pre-impregnated and the second fibrous structures of the strip are dry i.e. not pre-impregnated, or vice versa. According to a second variant, an outer layer of the strip is dry i.e. it is not pre-impregnated, whereas all or part of the other layers forming the strip are pre-impregnated. An outer layer corresponds to a layer defining a top or underside surface of the strip. The use of said dry textures can provide a grip for another woven or needled structure.

The two variants presented above apply to all the embodiments that are described hereafter.

In this example, the superposed fibrous layers 10 and 20 comprise fibres in first material on the first side 1000 and fibres in second material on the second side 2000. In other words, the fibres of the fibrous structures 11 and 12 are in first material and the fibres of the fibrous structures 12 and 22 are in second material.

The first material can be a thermal insulator and the second material a dielectric insulator. For example, the first material may comprise carbon and the second material can comprise glass. According to another variant, the first material can be a first thermal insulator and the second material a second thermal insulator differing from the first thermal insulator. In particular, the first thermal insulator can be adapted for thermal insulation of an underlying structure against a heat flow at a first temperature, and the second thermal insulator can be adapted for thermal insulation of an underlying structure against a heat flow at a second temperature lower or higher than the first temperature. As a variant, or in combination, the first thermal insulator can have a first density, and the second thermal insulator can have a second density lower or greater than the first density. Persons skilled in the art will easily appreciate that other applications are possible for a multi-material strip intended to be wound.

In one variant, the superposed fibrous layers 10 and 20 comprise a first resin in first material impregnating fibres on the first side 1000, and a second resin in second material impregnating fibres on the second side 2000. In other words, the resin impregnating the fibrous structures 11 and 21 is in first material and the resin impregnating the fibrous structures 12 and 22 is in second material. Therefore, the fibrous structures 11, 12, 21 and 22 are not necessarily impregnated with the same resin.

The multilayer strip 1*a* is in a single piece. In particular, there is continuity and cohesion of material between layers 10 and 20, and in particular continuity of the resin or resins with each other.

FIG. 3 particularly illustrates the continuity of material of the strip 1*a* along the longitudinal direction L.

The pairs of fibrous structures 11, 12 and 21, 22 each form segments that are repeated along the longitudinal direction L. It will be noted that the longitudinal or transverse edges may not be rectilinear, but may form a broken line or curve for example. Care can be taken so that the longitudinal edges 11*b* and 12*a* of the first layer 10, and the longitudinal edges 21*b* and 22*a* of the second layer 20 are sufficiently close to each other without necessarily touching. It will not depart from the invention if these longitudinal edges are in contact. However, care should be taken so that the edges 11*b* and 12*a* of the first layer 10, and the edges 21*b* and 22*a* of the second layer 20 are not overlaid.

The first layer 10, in its longitudinal direction L, comprises a plurality of first fibrous structures 11 on the first side 1000 and a plurality of second fibrous structures 12 on the second side 2000. The second layer 20, in its longitudinal direction L, comprises a plurality of first fibrous structures 21 on the first side 1000 and a plurality of second fibrous structures 22 on the second side 2000. Each of the pairs of fibrous structures 11 and 12, and 21 and 22, is therefore a segment of each fibrous layer 10, 20. The fibrous layers are therefore segmented along the longitudinal direction L of the multilayer strip. A first fibrous structure 21 of the second layer 20 overlaps at least two consecutive first fibrous structures 11 of the first layer 10, and a second fibrous structure 22 of the second layer 20 overlaps at least two consecutive second fibrous structures 12 of the first layer 10.

According to one particular embodiment of the invention, each layer of the multilayer strip may comprise more than two fibrous structures in different materials in its width, to obtain a stack of at least three layers of superposed material once winding is completed.

Figure 4:
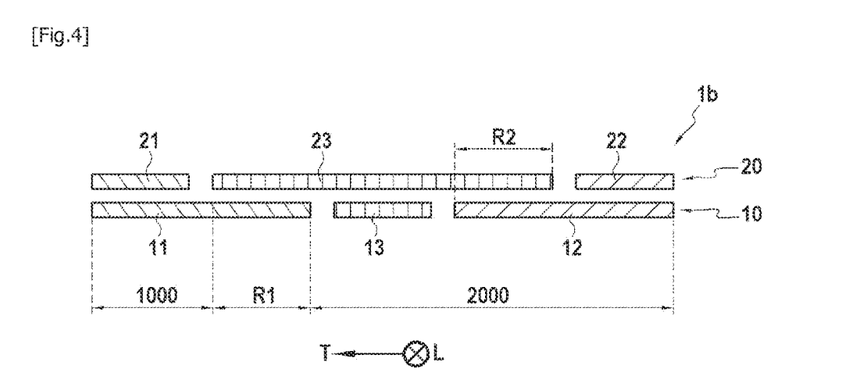
FIG. 4 is an exploded, schematic cross-sectional view in perspective of a multi-material multilayer strip comprising three fibrous structures in different materials within one same layer, conforming to another embodiment of the invention.

For example, FIG. 4 illustrates a first layer 10 comprising a first pre-impregnated fibrous structure 11 comprising a first material on a first side 1000 of the width of the strip 1*b*, a second pre-impregnated fibrous structure 12 comprising a second material differing from the first on a second side 2000 of the width of the strip 1*b* opposite the first side 1000, and a third pre-impregnated fibrous structure 13 comprising a third material differing from the first positioned between the first fibrous structure 11 and the second fibrous structure 12 in the width of the strip 1*b*. A second layer 20 superposed on the first layer 10 comprises a first pre-impregnated fibrous structure 21 comprising the first material on the first side 1000, a second pre-impregnated fibrous structure 22 comprising the second material on the second side 2000, and a third pre-impregnated fibrous structure 23 in third material positioned between the first fibrous structure 21 and the second fibrous structure 22, with overlapping over a distance R1 of the third fibrous structure 23 of the second layer 20 over the first fibrous structure 11 of the first layer 10, and with overlapping over a distance R2 of the third fibrous structure 23 of the second layer 20 over the second fibrous structure 12 of the first layer 10, or overlapping of the second fibrous structure of the second layer over the third fibrous structure of the first layer (non-illustrated variant).

It is possible to have overlap of the third material of at least one among the first and second layers over the first material and the second material of the other among the first and second layers. In the example illustrated in FIG. 4, there is overlap of the third material of the second layer 20 over the first and second materials of the first layer 10.

These overlaps allow securing of the second layer 20 onto the underlying first layer 10. The overlap distances R1 and R2 in this example can be such as described above.

In one example, the third material can be an interposition material ensuring compatibility between the first and second materials, for example when these are chemically incompatible.

Figure 5:
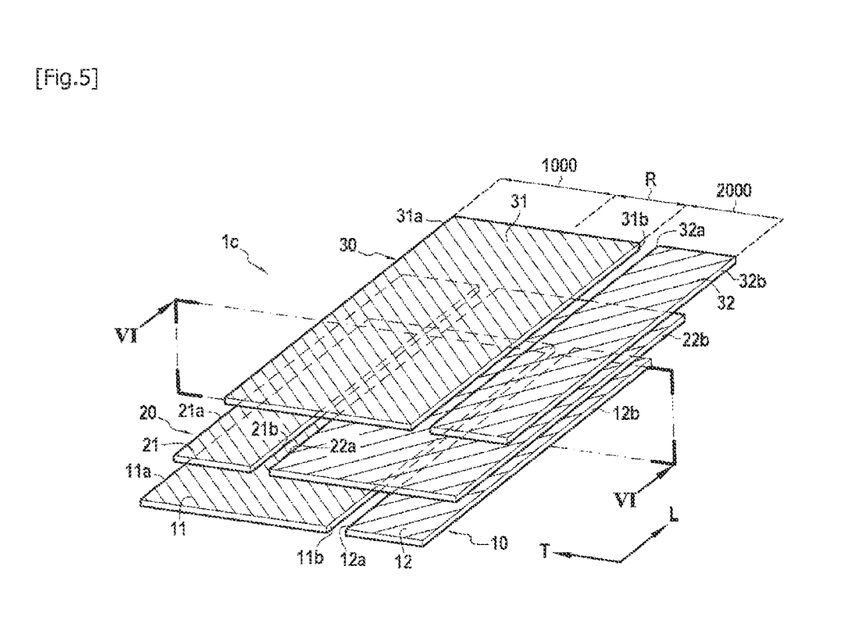
FIG. 5 is an exploded, perspective schematic view of a multi-material multilayer strip comprising three superposed layers, conforming to another embodiment of the invention.
Figure 6:
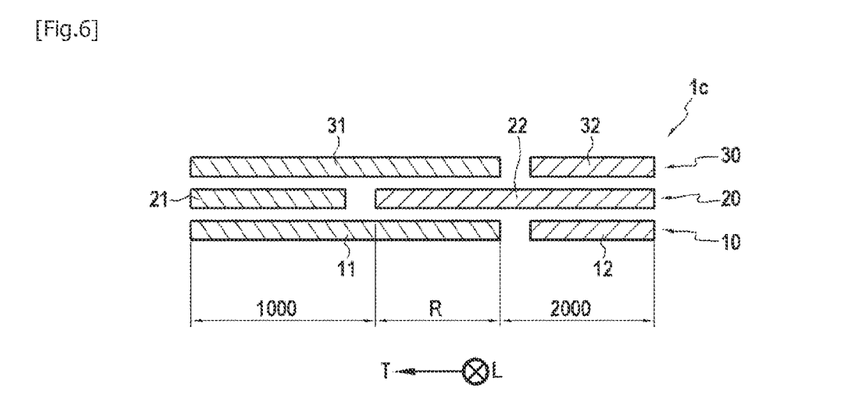
FIG. 6 is a schematic cross-sectional view of FIG. 5 taken transverse to the longitudinal direction of the strip.

FIGS. 5 and 6 show a multilayer strip 1*c* comprising three superposed layers 10, 20 and 30 in another embodiment of the invention. As is detailed below, this strip 1*c* can be used to manufacture a part in composite material. A configuration having at least three layers 10, 20 and 30 is beneficial since it imparts better strength to the strip 1*c* due to a double overlap, and allows a subsequent gain in winding since the amount of material deposited on each turn is increased.

The multilayer strip 1*c* here reproduces the structure of the multilayer strip 1*a* detailed in FIGS. 1-3. The multilayer strip 1*c*, in addition to the stack of two layers 10 and 20 previously described, comprises a third layer 30 comprising a first pre-impregnated fibrous structure 31 comprising the first material on the first side 1000 of the width of the strip 1*c*, delimited by two longitudinal edges 31*a* and 31*b*, and a second pre-impregnated fibrous structure 32 comprising the second material on the second side 2000 of the width of the strip 1*c*, delimited by two longitudinal edges 32*a* and 32*b*.

The third layer 30 is superposed on the second layer 20, with overlap over a distance R of one of the fibrous structures of the third layer 30 comprising one of the first and second materials, over a fibrous structure of the second layer 20 comprising the other of the first and second materials. In this example, the superposing of the second and third layers 20 and 30 is obtained by overlapping over a distance R of the first fibrous structure 31 of the third layer 30 over the second fibrous structure 22 of the second layer 20. This overlapping allows securing of the third layer 30 onto the underlying second layer 20. The fibrous structure 31 of the third layer 30 overlaps the longitudinal edges 21b and 22a of the fibrous structures 21 and 22 of the second layer 20. In a non-illustrated variant, it is possible to obtain overlapping of the second fibrous structure 32 of the third layer 30 over the first fibrous structure 21 of the second layer 20.

The overlap distance R is sufficient to obtain cohesion of the strip 1c and can be such as described above per pair of consecutive layers in the direction of stacking. In this example, the overlap distance R is the same between the first layer 10 and the second layer 20, and between the second layer 20 and the third layer 30. The overlap distance between the first and second layer may differ from the overlap distance between the second and third layer, provided that the overlap distances are sufficient to obtain a cohesive strip 1c.

In the example described here, the three layers are also superposed so that the longitudinal edges 11a, 21a and 31a are superposed and so that the longitudinal edges 12b, 22b et 32b are superposed.

The fibrous structures 31 and 32 each form segments that are repeated along the longitudinal direction L, similar to the segments illustrated in FIG. 3. It will be noted that the longitudinal or transverse edges may not be rectilinear but for example may form a broken line or a curve. Care can be taken so that the longitudinal edges 31b and 32a of the third layer 30 are sufficiently close without necessarily touching each other. It would remain within the scope of the invention if these longitudinal edges were in contact. However, care should be taken so that the edges 31b and 32a of the third layer 30 are not overlaid.

The fibrous structures 31 and 32 of the third layer 30 have the same structure as the fibrous structures 11, 12, 21 and 22 of the first and second layers 10 and 20. Similar to the fibrous structures 11, 12, 21 and 22 of the first and second layers 10 and 20, the fibres of the fibrous structures 31 and 32 of the third layer 30 can be in carbon, in Kevlar, in ceramic e.g. in silica, in glass, in silicon carbide (SiC). The fibrous structures 31 and 32 of the third layer 30 can be impregnated with at least one cross-linkable resin e.g. an epoxy resin or phenolic resin, or a precursor resin of carbon or silicon carbide (SIC).

In this example, the three superposed fibrous layers comprise fibres in first material on the first side 1000 and fibres in second material on the second side 2000. The first material can be a thermal insulator and the second material a dielectric insulator. For example, the first material may comprise carbon and the second material can comprise glass. As a variant, the first and second materials can be thermal insulators as described above. Those skilled in the art will easily appreciate that other combinations of materials are possible for a multi-material strip intended to be wound.

According to one variant, the three superposed fibrous layers comprise a first resin in first material impregnating fibres on the first side 1000, and a second resin in second material impregnating fibres on the second side 2000.

The multilayer strip 1c here is in a single piece. In particular, there is continuity and cohesion of material between layers 10, 20 and 30, and in particular continuity of the resin or resins with each other.

A description has been given of strips with two or three superposed layers, but it would evidently not depart from the invention if the strips comprised more than three superposed layers. In this case, the overlaps between adjacent layers can be alternated as illustrated in FIG. 5.

Figure 7:
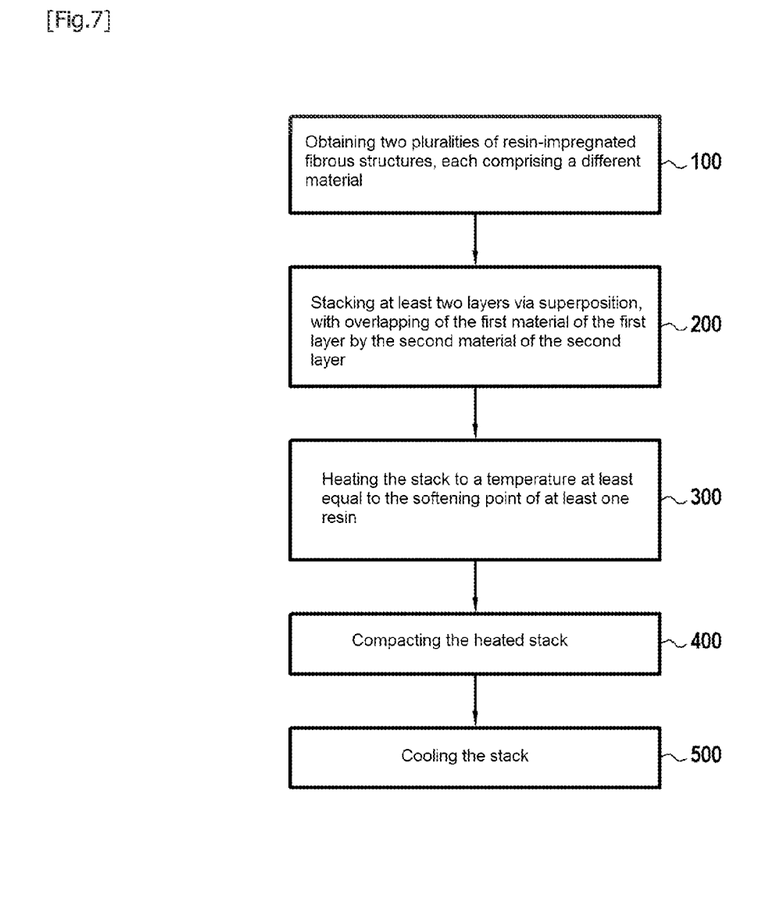
FIG. 7 is a flow diagram illustrating the steps of a method for manufacturing a multilayer strip according to one embodiment of the invention.

A method for manufacturing a multilayer strip of the invention will now be described in conjunction with the flow diagram in FIG. 7.

At a first step 100, two pluralities of fibrous structures are obtained pre-impregnated with resin(s), each plurality comprising a different material. It would remain within the scope of the invention if additional pluralities of fibrous structures are used comprising other different materials.

In this example, the fibrous structures are two-dimensional fabrics. However, it would remain within the scope of the invention if the fibrous structures have a different structure as mentioned in the preceding embodiments. The possible materials for obtaining these fibrous structures are also described in the preceding embodiments.

At a second step 200, layers are produced from the fibrous structures previously obtained and are stacked by superposition as described in the preceding embodiments. Therefore, the stack at least comprises the two layers 10, 20 described in FIGS. 1-3.

At a third step 300, the stack formed at step 200 is heated to a temperature at least equal to the softening point of at least one resin contained in the stack. At following step 400, the heated stack is compacted to cause the stacked layers to adhere to each other. The softened resin can therefore cause adhesion between the layers. It is noted that the softening point is a temperature at which the resin slightly liquefies without polymerizing or crosslinking. The heating 300 and compacting 400 steps can be performed simultaneously in a hot press for example.

One possibility for performing steps 200, 300 and 400 is to use a device such as described in document EP3418046, comprising a conveyor, two loading devices and a hot press, or comprising a robotized positioning step of the layers.

At step 500, the heated, compacted stack is cooled to obtain a multilayer strip intended to be wound.

Figure 8:
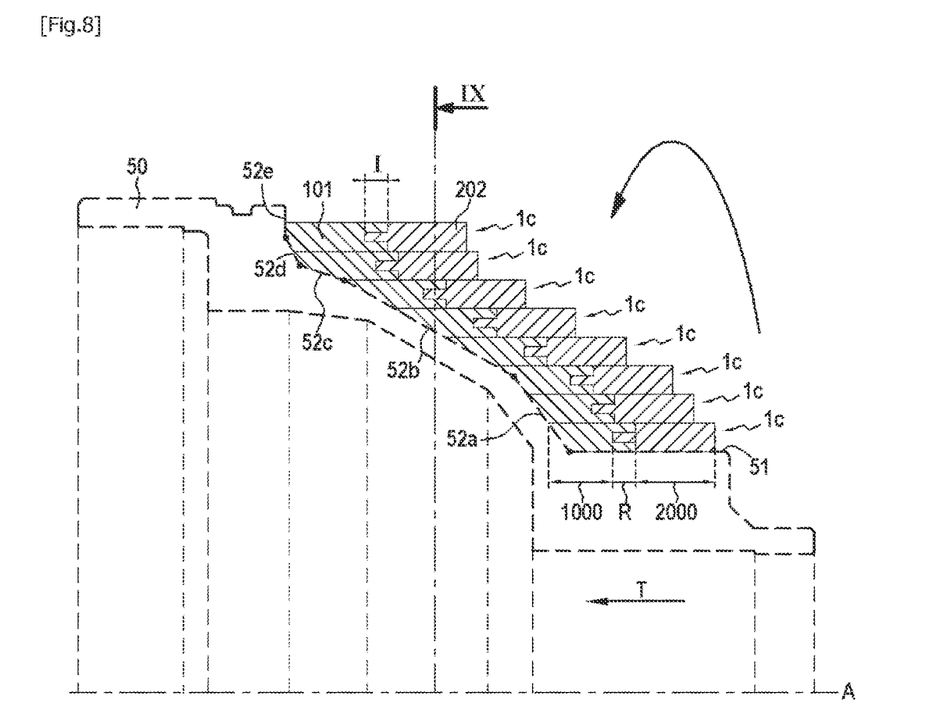
FIG. 8 is a partial, schematic cross-sectional view of a fibrous preform obtained after winding a multilayer strip in one example of the method of the invention, the cross-sectional plane comprising the axis around which the strip was wound.
Figure 9:
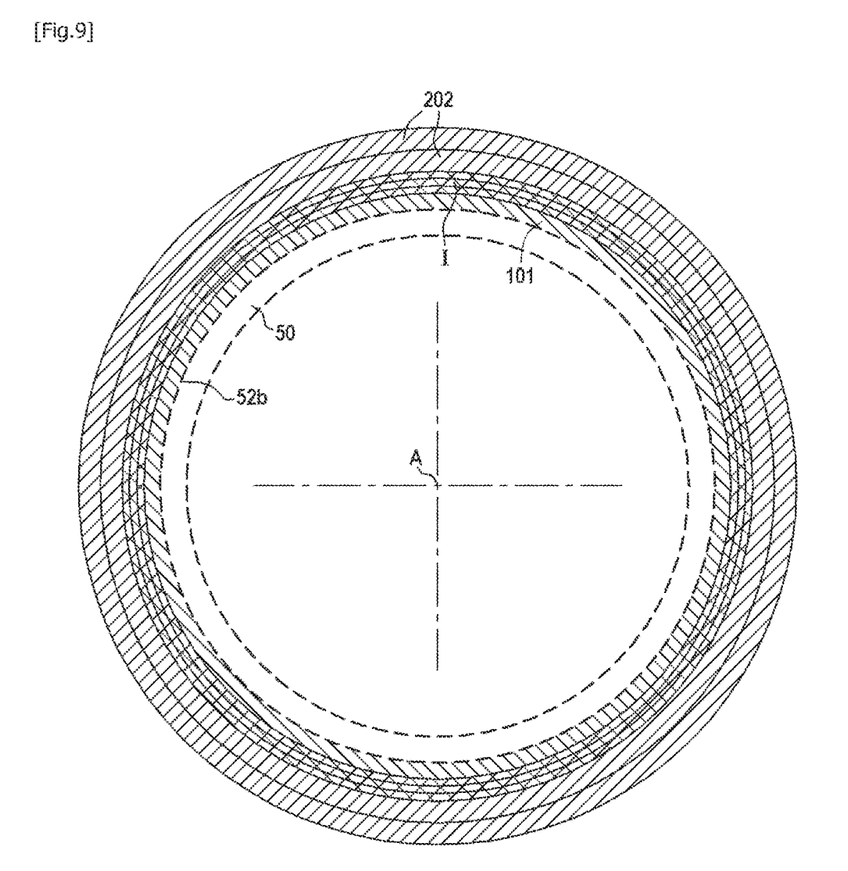
FIG. 9 is a schematic cross-sectional view of the preform in FIG. 8, the cross-sectional plane being perpendicular to the axis around which the strip was wound.

FIGS. 8 and 9 schematise a fibrous preform obtained after winding a multilayer strip in an example of a method of the invention, when the surface to be wound is a developable surface.

The multilayer strip 1c is applied by winding around a winding tool 50 of axis of revolution A which is also the winding axis. As previously described, the multilayer strip 1c has fibrous structures comprising the first material 101 on the first side 1000 and fibrous structures comprising the second material 202 on the second side 2000.

Initially the multilayer strip 1c is wound on surface 51, the transverse direction T of the multilayer strip 1c being directed along the axis of revolution A. The multilayer strip 1c is then wound around the axis of revolution A moving towards the opposite surface 52e, i.e. towards the left in the drawing, until the surfaces 52a, 52b, 52c and 52d of the tool 50 are covered.

In the example illustrated in FIGS. 8 and 9, the surface to be wound is developable. For a surface to be wound having non-developable portions, the surfaces of which form a nonzero angle with the axis of revolution, the winding method described in document EP3492249A1 can be used applying the multilayer strip of the invention around a non-developable winding tool.

The orientations of the fibres in the multilayer strip can be adapted to the winding to be carried out. For example, skilled persons are able to adapt the orientation of the fibres in the multilayer strip to the winding under consideration in the event of unidirectional or bidirectional fibrous structures.

As a result, a preform is directly obtained in a single winding step with stacking of materials 101 and 202, with a transition zone I where the materials 101 and 102 are present as can be seen in FIG. 8 and in the cross-section in FIG. 9. The part can then be obtained by heat treating the preform obtained, for example to cure or crosslink the resin(s) present.

In addition, with this method it is possible to obtain an orthotropic preform by winding the multilayer strip 1c.

It is therefore possible to manufacture a rocket engine part such as a divergent rocket engine nozzle.

The expression «between . . . and . . . » is to be construed as including the limits.

The invention claimed is:

1. A multilayer strip intended to be wound on a form to manufacture a part in composite material, comprising superposed fibrous layers, at least one of these layers being pre-impregnated, said superposed fibrous layers comprising:
    a first layer comprising a first material on a first side of the width of the strip, and a second material, differing from the first material, on a second side of the width of the strip opposite the first side, and
    a second layer superposed on the first layer and comprising the first material on the first side and the second material on the second side, with overlapping of a material of the second layer over a different material of the first layer.

2. The multilayer strip according to claim 1, wherein the first and second layers further comprise a third material differing from the first and second materials and positioned therebetween.

3. The multilayer strip according to claim 1, wherein the superposed fibrous layers further comprise a third layer superposed on the first and second layers, the third fibrous layer comprising the first material on the first side and the second material on the second side, with overlapping of a material of the third layer over a different material of the second layer.

4. The multilayer strip according to claim 1, wherein an outer fibrous layer is dry.

5. The multilayer strip according to claim 1, wherein one of the sides of the strip among the first side and second side is pre-impregnated, the other side being dry.

6. The multilayer strip according to claim 1, wherein the first side and second side of the strip are pre-impregnated.

7. The multilayer strip according to claim 6, wherein the superposed fibrous layers comprise a first resin in first material impregnating fibers on the first side, and a second resin in second material impregnating fibers on the second side.

8. The multilayer strip according to claim 1, wherein the superposed fibrous layers are two-dimensional fabrics.

9. The multilayer strip according to claim 1, wherein the superposed fibrous layers are segmented to form a series of consecutive segments along a longitudinal direction of the strip, two consecutive segments of the series of consecutive segments of one layer of the superposed fibrous layers being joined via overlapping by a segment of an adjacent layer of the superposed fibrous layers.

10. The multilayer strip according to claim 1, wherein the superposed fibrous layers comprise fibers in first material on the first side and fibers in second material on the second side.

11. The multilayer strip according to claim 1, wherein one of the first and second materials is a thermal insulator and another of the first and second materials is a dielectric insulator.

12. The multilayer strip according to claim 1, wherein one of the first and second materials is a first thermal insulator and another of the first and second materials is a second thermal insulator differing from the first thermal insulator.

13. A method for manufacturing a fibrous preform of a part in composite material, comprising winding a multilayer strip around a form, the multilayer strip comprising superposed fibrous layers, at least one of these layers being pre-impregnated, said superposed fibrous layers comprising
    a first layer comprising a first material on a first side of the width of the strip, and a second material, differing from the first material, on a second side of the width of the strip opposite the first side, and
    a second layer superposed on the first layer and comprising the first material on the first side and the second material on the second side, with overlapping of a material of the second layer over a different material of the first layer.

14. A method for manufacturing a part in composite material comprising manufacturing a fibrous preform by implementing a method according to claim 13, and heat treating at least one resin present in the preform to obtain the part in composite material.

15. The method according to claim 14, wherein the part is a rocket engine part.

* * * * *